May 27, 1969  E. HENN ET AL  3,446,441
FLAME SCARFING UNIT
Filed Dec. 22, 1966
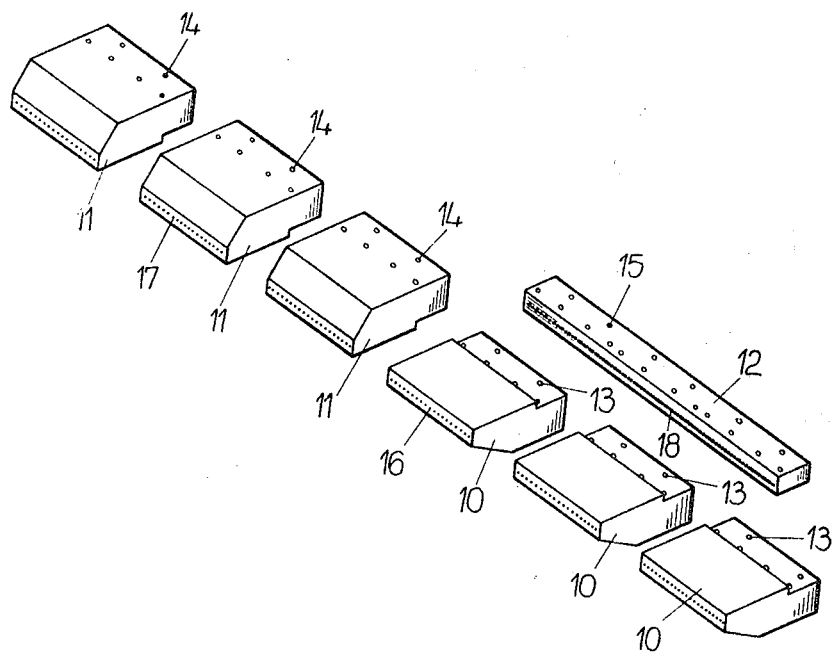

3,446,441
FLAME SCARFING UNIT
Erwin Henn, Urbach-Uberdorf uber Selters, and Dieter Kimm, Frankfurt am Main, Germany, assignors to Messer Griesheim G.m.b.H., Frankfurt am Main, Germany, a corporation of Germany
Filed Dec. 22, 1966, Ser. No. 603,829
Claims priority, application Germany, Nov. 5, 1966, M 69,448
Int. Cl. B05b 1/14, 1/00
U.S. Cl. 239—556          1 Claim

ABSTRACT OF THE DISCLOSURE

A flame scarfing unit includes a plurality of side-by-side flame scarfing torch heads attached to a common spacer which extends across the entire width of the unit. The spacer acts as both a support for the heads, as well as a means of conveying oxygen to each head. Additionally the spacer serves as a ready means for adjusting the relationship of the individual heads to each other.

Cross-reference to related application

This invention is a modification of the invention described in commonly assigned copending application which is now U.S. Patent No. 3,398,898, issued Aug. 27, 1968, which corresponds to German application M 67,749.

Background of the invention

The above noted German application (hereinafter referred to as the basic application) relates to a flame scarfing unit which includes a number of individual torch heads each of which includes its own separate spacer. By various means (such as slots, etc.), the heads are joined together and the exposed sides of the extreme or end heads are closed by stop plates.

A flame scarfing unit of the above type is advantageously used when a relatively wide workpiece or workpieces are to be flame-scarfed. After extended use of such a flame scarfing unit, one or several of the individual flame scarfing heads must be replaced and serviced. If these flame scarfing heads which are to be replaced are situated in the central area of the flame scarfing unit, all of the flame scarfing heads still intact, must then be dismantled—starting from the outside—before the dismantling of the head actually to be serviced is possible. After replacing the head and after adjusting the new head with the help of the adjusting disk as well as the attaching bolt with adjusting plate or the like (disclosed in the basic application), then the remaining removed flame scarfing heads must again be mounted and adjusted as well. Such a procedure of course is very time consuming.

The object of the invention is to provide a unit which overcomes this problem.

Summary of the invention

For the solution of this problem the unit of this invention includes a spacer extending continuously over the entire width of the flame scarfing unit and at the same time serving for the adjusting of the individual flame scarfing heads.

Of course it is also feasible and within the scope of the invention to arrange, where necessary or desired, additional individual heads along side the main unit in the manner described in the basic application. In such an arrangement, the main spacer would not extend across the entire width of the new larger flame scarfing unit.

An advantage of a flame scarfing unit according to the above invention is that individual flame scarfing heads can be comparatively simply and quickly replaced, where the necessity of dismantling and remounting of the still intact and otherwise usable flame scarfing heads is eliminated. Furthermore, the inventive spacer affords a better and quicker adjusting of the individual flame spraying heads to each other, since the spacer is superior, because (being a common support), its adjusting surfaces extend over several flame scarfing heads as well as having sturdy construction. The spacer is thus arranged with respect to the adjusting disks and slots described in the basic application, that readjustments are superfluous which were otherwise necessary as in the basic application by means of attaching bolts and adjusting plates. If a replacement of the entire flame scarfing unit should be necessary, the replacement no longer presents any difficulties because of the above invention. In this respect according to the basic application, the dismantling of a flame scarfing unit still meant a dismantling of the individual flame scarfing heads from their back head parts, now however the entire flame scarfing unit, which is held together by the continuous common spacer, can be dismantled as a whole and transferred to the manufacturing firm for overhauling. Thus the work required by the operator of the flame scarfing machine—generally a customer of the manufacturing firm of this flame scarfing machine—in replacing the unit is now advantageously reduced to a minimum.

Brief description of the drawing

An embodiment of the invention is illustrated in the single figure which shows the flame spraying unit in an exploded view.

Detailed description of the invention

The unit illustrated in the drawing consists of three flame scarfing heads. Each head has a lower lip part 10 and an upper lip part 11. The lip parts 10, 11 are attached by bolts (not shown) to a common spacer 12 extending over the entire width of the flame scarfing unit. Spacer 12 thereby also serves for adjusting of the individual flame scarfing heads to each other.

For coupling the lip parts 10, 11 to the spacer 12 there are provided borings 13 or 14 in the lower lip 10 or upper lip parts 11 as well as tapped holes 15 in the spacer 12.

The flame scarfing unit is attached at the head parts in a backward direction. Since the specific attachment is illustrated in the basic application, it is not illustrated herein. Reference is made, however, to elements 1 or 27 in FIGS. 1 and 2 of the basic application.

Borings 16 or 17 at the lower lip 10 or upper lip 11 serve for the fuel gas supply as described in the basic application with respect to elements 25 or 24. The borings designated by 18 in the spacer 12 likewise correspond to the borings 30 the basic application and also serve for the oxygen supply.

The embodiment of the invention described above and shown in the drawing serves only as an illustration of the invention, which of course thusly is not limited to this example.

What is claimed is:

1. A flame scarfing unit comprising an elongated spacer being rectangular in cross-section, a plurality of oxygen feeding orifices in said spacer, a plurality of fuel gas feeding upper lips, each of said upper lips having a rectangular recess at its rear end, a plurality of fuel gas feeding lower lips, each of said lower lips having a rectangular recess at its rear end, the sum of the depths of the recesses in opposed upper and lower lips being less than the thickness of said spacer, said spacer being mounted in said recesses with said upper and lower lips secured thereto thereby defining a slot between the upper surfaces of said lower lips and the lower surfaces of said upper lips whereby oxygen may be discharged through said spacer and out of said slot.

References Cited

FOREIGN PATENTS 149,442  3/1955  Sweden.

EVERETT W. KIRBY, *Primary Examiner.*

U.S. Cl. X.R.

239—600